US009360988B2

(12) United States Patent
Callaghan et al.

(10) Patent No.: US 9,360,988 B2
(45) Date of Patent: Jun. 7, 2016

(54) BROWSING AND QUALITY OF SERVICE FEATURES

(71) Applicant: Microsoft Corporation, Redmond, WA (US)

(72) Inventors: David M. Callaghan, Kirkland, WA (US); Robert Joseph Devine, Kirkland, WA (US); Evgeny Veselov, Sammamish, WA (US); Arron Eicholz, Enumclaw, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 13/769,711

(22) Filed: Feb. 18, 2013

(65) Prior Publication Data
US 2013/0232009 A1 Sep. 5, 2013

Related U.S. Application Data

(63) Continuation of application No. 13/365,337, filed on Feb. 3, 2012, now Pat. No. 8,380,565, which is a continuation of application No. 12/147,361, filed on Jun. 26, 2008, now Pat. No. 8,135,616.

(51) Int. Cl.
G06Q 30/00 (2012.01)
G06F 3/0481 (2013.01)
G06Q 40/00 (2012.01)
(Continued)

(52) U.S. Cl.
CPC ............ G06F 3/0481 (2013.01); G06Q 30/02 (2013.01); G06Q 30/0241 (2013.01); G06Q 30/0247 (2013.01); G06Q 30/0273 (2013.01); G06Q 30/0277 (2013.01); G06Q 30/0283 (2013.01); G06Q 30/04 (2013.01); G06Q 40/12 (2013.12)

(58) Field of Classification Search
USPC ........................................ 705/14, 4
See application file for complete search history.

(56) References Cited

U.S. PATENT DOCUMENTS 5,778,372 A 7/1998 Cordell et al. ................ 707/100
6,128,651 A 10/2000 Cezar ............................ 709/217
(Continued)

FOREIGN PATENT DOCUMENTS

WO WO 00/79446 A1 12/2000
WO WO 2007/073584 A1 7/2007

OTHER PUBLICATIONS

Chen, Yu et al., "Adapting Web Pages for Small-Screen Devices," IEEE Computer Society, Jan.-Feb. 2005, pp. 2-8.
(Continued)

Primary Examiner — Ojo Oyebisi
(74) Attorney, Agent, or Firm — Sunah Lee; Kate Drakos; Micky Minhas

(57) ABSTRACT

Embodiments are configured to provide browsing and other functionality that can be used to provide viewable data based in part on a current viewable space of a browser interface, but the embodiments are not so limited. In an embodiment, components of a system can operate to communicate viewable data to a browser engine based in part on a configuration of the browser engine and/or a display architecture. In one embodiment, a computing device includes a browser application that can be used to provide data associated with viewable portions of a browser display, wherein the provided data can be used to monetize advertising revenue according to monetization and/or advertising requirements.

17 Claims, 9 Drawing Sheets

(51) Int. Cl.
  *G06Q 30/04*  (2012.01)
  *G06Q 30/02*  (2012.01)

(56) References Cited

U.S. PATENT DOCUMENTS

| | | | |
|---|---|---|---|
| 6,279,036 B1 | 8/2001 | Himmel et al. | 709/224 |
| 7,188,312 B2 | 3/2007 | Hsiu-Ping et al. | 715/525 |
| 7,287,220 B2 | 10/2007 | Kaasila et al. | 715/526 |
| 8,135,616 B2 | 3/2012 | Callaghan et al. | 705/14 |
| 8,380,565 B2 | 2/2013 | Callaghan et al. | |
| 2004/0095400 A1 | 5/2004 | Anderson et al. | 345/864 |
| 2005/0138633 A1* | 6/2005 | Barsade | G06Q 30/02 719/313 |
| 2006/0064647 A1 | 3/2006 | Tapuska et al. | 715/800 |
| 2006/0139371 A1 | 6/2006 | Lavine et al. | 345/620 |
| 2006/0224445 A1 | 10/2006 | Axe et al. | 705/14 |
| 2007/0067305 A1 | 3/2007 | Ives | 707/10 |
| 2007/0234239 A1 | 10/2007 | Sylthe et al. | 715/864 |
| 2007/0236742 A1 | 10/2007 | Hale et al. | 358/3.13 |
| 2009/0171710 A1 | 7/2009 | Shrivathsan et al. | 705/7 |
| 2009/0210514 A1* | 8/2009 | Davis | G06F 17/30905 709/219 |

OTHER PUBLICATIONS

Whitnah, Tom, The Facebook Blog, Facebook, "We're Open for Commentary," http://blog.facebook.com/blog/php2post=20877767130, Facebook © 2008, 2 pages.

\* cited by examiner

BROWSING AND QUALITY OF SERVICE FEATURES

CROSS REFERENCE TO RELATED APPLICATIONS

The present application is a continuation of U.S. patent application Ser. No. 13/365,337, filed Feb. 3, 2012, now U.S. Pat. No. 8,380,565, entitled Browsing and Quality of Service Features, which is a continuation of application Ser. No. 12/147,361, filed Jun. 26, 2008, entitled Browsing and Quality of Service Features, now U.S. Pat. No. 8,135,616 which are assigned to the assignee of the present application, and hereby incorporated by reference.

BACKGROUND

Computing devices, including mobile communication devices, have become essential tools for business and personal uses. Advances in computing power, communication functionality, and storage capacity continue to enhance the user experience. Handheld and other portable computing devices can include web browsing, graphics, and video processing capabilities. The size of many handheld and portable devices tends to result in a limited space for displaying content. For example, mobile phones and other smart handheld devices include browsers that can be used to access the web and display content of a web page on the associated displays. Users can use zoom and scrolling controls to view portions a web page that are difficult to view or not being currently displayed due in part to the limited display area of an associated display.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide browsing and other functionality that can be used to provide viewable data based in part on a current viewable space of a browser interface, but the embodiments are not so limited. In an embodiment, components of a system can operate to communicate viewable data to a browser engine based in part on a configuration of the browser engine and/or a display architecture. In one embodiment, a computing device includes a browser application that can be used to provide data associated with viewable portions of a browser display, wherein the provided data can be used to monetize advertising revenue according to monetization and/or advertising requirements.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
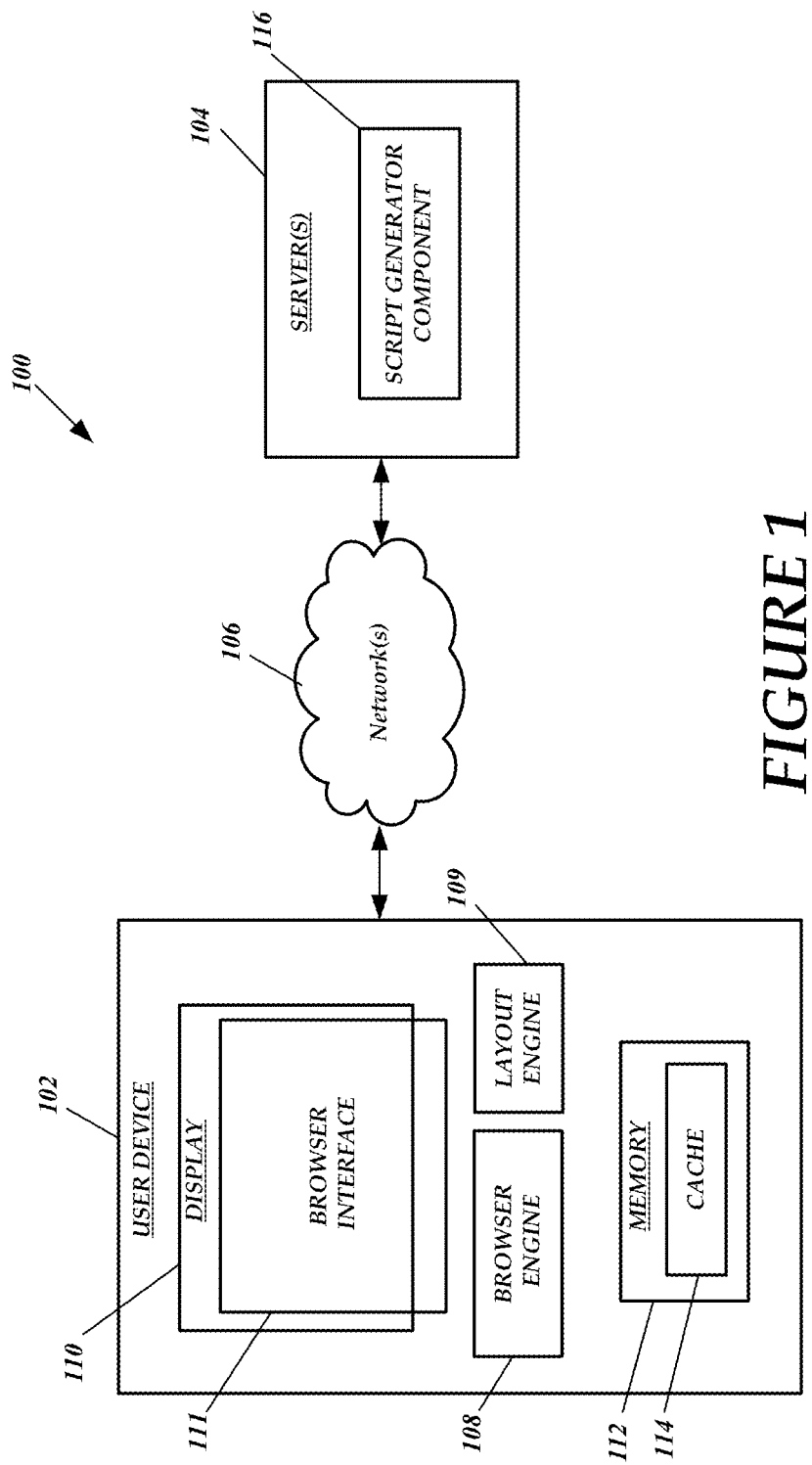
FIG. 1 is a diagram illustrating an exemplary system that includes browsing and other functionality.

Embodiments are configured to provide browsing and other functionality that can be used to provide viewable data based in part on a current viewable space of a browser interface and/or aspects of a device display, but the embodiments are not so limited. In an embodiment, components of a system can operate to communicate viewable data to a browser engine based in part on a configuration of the browser engine and/or a display architecture. For example, viewable data can be requested by the browser engine based in part on a dynamic layout engine using parameters associated with a display resolution and configuration of a browser window (e.g., full screen vs. browser application resized to cover only a percentage of a visible display area).

The browser engine can be configured to: operate with a variety of communication protocols to receive and translate information from one or more servers, display text, images, etc. associated with a viewable portion or space of a browser interface by interpreting instructions of a requested page and/ or from one or more servers; run embedded programs; launch external programs; and/or provide view data for use in advertising models. For example, advertising charges can be determined based in part on whether all or a portion of an advertisement image is requested by the browser engine when requesting web page data for a viewable portion of a display. A pro-rated or other charge can be assessed against an advertisers account based on a request and/or whether the advertisement was rendered in the viewable portion of the display.

Browser applications in conjunction with the browser engine and other applications can operate to optimize network downloads by using an associated layout engine to interact with the display subsystem to determine when images (and other content) would have been rendered completely or partially outside and/or inside an application display window. The layout display interaction enables the browser to provide network bandwidth efficiency by intentionally avoiding retrieving images and other content which fall outside the visible regions. Accordingly, an event driven mechanism can be used to provide quality of service attributes for advertisers to target a percentage of the visible image or display region which can prevent charging advertisers for images retrieved and rendered partially visible or outside the visible region of the display by avoiding requests for the content.

In various embodiments, the browser engine can be configured to request one or more complete image files or portions of one or more image files associated with the current viewable space and/or next viewable space of a browser display. Embedded web objects, web page scripts, and/or other features can be used to provide one or more complete image files or portions of one or more image files and/or a load receipt or other communication event which for use in providing and monetizing browsing data. For example, executing scripts provided by the web designer or embedded in the images such as using steganography or displaying embedded objects which retrieve a remote image or images when visible in a current viewable area of a browser window. As further example, the browser engine can request/load tiles/zones adjacent and/or contiguous to a current viewable area of a browser window and issue load receipt events associated with the current viewable pixel and other data. As described below, the browser engine can cache or otherwise store browser data associated with a prior viewable portion of the browser display. The browser engine can also operate to publish viewable space information in conjunction with one or more servers to dynamically download bits/tiles/zones associated with viewable and/or unviewable content for use by the browser engine.

In another embodiment, a browser application, which includes executable instructions, can be used in conjunction with a computing device of a communication network to browse the network. As an example, a handheld computing device, such as a smart phone, etc., can include the browser application that a user can use to surf the Internet. The browser application can operate to limit data fetch requests to only those which would provide viewable data associated with a current viewable portion of a browser interface. That is, the browser application can operate to limit data requests to browser data that corresponds to a current viewable portion of the browser interface, but is not so limited.

In yet another embodiment, a user can enable/disable a data miser feature associated with a browser application. When the data miser feature is enabled, the browser application can operate to selectively request/load browser data based in part on a determination of a current viewable space of a browser interface. In addition to providing browsing functionality, the browser application can be used to assist in monetizing advertising revenue according to monetization and/or advertising requirements.

In one embodiment, the browser application can operate to communicate a tolling event to a serving device once all or a defined portion of an advertisement has been rendered in the viewable portion of a browser window as part of rendering a viewable portion of a web page. The tolling event can include information associated with how much of the advertisement was displayed in the browser interface. An advertising or business model can use a tolling event to determine whether an advertiser should be charged for the display of an advertisement. As an example, the browser application can communicate information to the serving device associated with dimensions of an ad that were in the visible pane of the browser, wherein the information can be used by businesses and other entities to quantify advertising requirements and contractual arrangements. Other embodiments are described below.

FIG. 1 is a diagram depicting an exemplary system 100 that includes browsing and other functionality. For example, components of the system 100 can be used to provide browsing data to a user based in part on a current viewable space of a browser interface 111. The system 100 can incorporate protocols, Internet Service Providers (ISPs), Network Service Providers (NSPs), modems, routers, gateways, and/or other components and functionality to facilitate web browsing to retrieve and interact with web page and other data. As further example, components of the system 100 can be used to provide a quality of service delivery when monetizing advertisements as part of an impression or other advertising business model. As shown in FIG. 1, the system 100 includes a user device 102, such as handheld computing/communication device, laptop, desktop, or other computing/communication device.

The user device 102 is in communication with at least one server 104 via one or more communication networks 106, hereinafter network 106. The system can include a plurality of users, associated devices, systems, and/or other components. The system 100 includes an infrastructure and functionality to enable the user 102 to access web pages and other information associated with the network 106. Depending on the configuration of a browser interface 111 and/or device display 110, portions of web page may not need to be retrieved by the browser engine 108 since the portions are not currently visible to the user.

These portions can be represented by the region(s) of the browser interface that extends outside the visible display region of the display 110. The content is outside the display region through either a virtual desktop or by content which can be scrolled up/down left/right to view additional regions of a page. As described below, content outside the visible region may not be requested/downloaded by the browser engine 108. In an embodiment, the browser engine 108 can operate in conjunction with the layout engine 109 to download images and other content based in part on: (1) the image position on a web page inside the browser application (e.g., have to scroll to see it); (2) the position of the browser application within the virtual desktop/display portal; and/or (3) whether other windows or applications occlude the visibility of the images and/or content.

A web page can be described as a number of bits of a data configured according to a defined language, such as hypertext markup language, extensible markup language, etc. Moreover, a web page can be dynamically generated and include markup tags that describe the layout and associated formatting of the web page. In one embodiment, height and width attributes of <IMG> tags and/or other additional tag attributes can be used to indicate a size and quality of service percentage (%) reduction that can be used to monetize impression-based advertisements. For example, a developer or other web designer can use a java script to insert an ad call into a web page, including what size ad to include (e.g., ad calls associated with 300×400 on the right pane and a top banner at a 600×100). A web page can include text, graphics and other images, video, audio, etc. As described below, images and other content may be requested and/or retrieved from the server 104 when they can be displayed within the union of the area represented by the browser application window and the display (e.g., the current viewable region).

According to an embodiment, and as described further below, the user device 102 includes a browser engine 108 that can be used to access web pages and other data from the server 104 and/or other servers and components of the system 100 or some other system. Server 104 can be in communication with other servers and client devices, according to a networked computing environment, such as the World Wide Web (WWW) for example, as well as a private intranet and other systems. The user device also includes a display 110 for displaying browser data, which may include video, text, graphics, etc. For example, launching the browser opens a browser window in the display 110, wherein the browser window can include a web page that a user is interacting with based in part on a submitted uniform resource locator (URL). In some cases, a portion of a web page may be downloaded such that only the portion is displayed due in part to the configuration of the browser window, display resolution, pixel count, pixel configuration, and/or a physical size of the display. Moreover, a plurality of such browser windows can be opened and displayed, dependent upon the size and resolution of the display. Further the display may be physically attached to the device 110, or be a remote client to the device such as a virtual desktop or remote desktop application.

The user device 102 also includes a memory 112 and a cache 114. The cache 114 can be used to store web page and other data. For example, the browser engine 108 can operate to store viewable web page data in the cache so that portions of the same web page do not have to be downloaded if the user requests viewable portions of the web page on more than one occasion. In one embodiment, other web page data, such as web page data that is contiguous with or adjacent to viewable web page data can be requested from the server 104 and stored in cache 114. For example, a portion of an advertisement image may be viewable to a user based in part on the current viewable space of a browser window and the browser engine 108 can operate to substitute the unviewable portion of the advertisement image in the cache 114 as part of a prioritized download request based in part on a ratio threshold for displaying the image (e.g., if the image will be reduced to a certain %, do not request the image from server 104 and/or substitute a local image). The user device 102 can include other components and functionality and is not limited to the embodiments and examples described herein.

With continuing reference to FIG. 1, and in accordance with an embodiment, the browser engine 108 can be configured to dynamically fetch or request viewable bits of a web page, document, or other information resource based in part on a browser configuration, display resolution, pixel count, pixel configuration, and/or display size, but is not so limited. As an example, a user can select a data miser feature to configure the browser engine 108 to limit its data requests to web page data that is associated with a current viewable space of a browser interface or window. The browser engine 108 can use a window manager and/or other operating system (OS) component or functionality to determine a size, orientation, and/or location of a window being used to provide the browser and associated browser controls.

For example, the user device 102 can use an application programming interface (API) call (e.g., getwinrecviewablerec, etc.) to determine a resolution, size, and/or configuration of a current visible or viewable space of a browser interface 111. The browser engine 108 can also be configured to fetch or request other web page data (e.g., text, images, etc.) that is not within the current viewable space. For example, assume a user has scrolled down to view another portion of a web page. In this example, the browser can also request and download other unviewable content immediately below or adjacent to the content that was just scrolled to. The browser application can also define an attribute for the perimeter for the amount of loading for regions off screen. For example load up to 250 pixels above and below the visible region.

As described above, a request for web page data can include information associated a current viewable space of the browser display or interface that can be used to quantify web page data to be included as part of a download package. Moreover, the browser engine 108 can operate to provide feedback to the server 104 or other component(s) as to what the user is currently viewing. The feedback provided by the browser engine 108 can be based in part on the current browser interface configuration (e.g., window size, orientation, location, scroll location, etc.) display resolution, pixel information, physical size of the display, etc.).

For example, java script, active server page (ASP), cascading style sheet (CSS), and other functionality can be used to pass information between the browser engine 108 and the server 104 (e.g., <img src="/images/resource.asp?w=%img.width%&h=%img.height%&r=0.50">, -ms-alt-url (fullimage.png, altimage.png, 0.50, -ms-alt-url(fullimage.png, placeholder, 0.50), wherein the "placeholder" key identifies using a built-in image placeholder that the browser provides when the ratio is satisfactory and/or according to quality of service preferences.) Accordingly, in addition to information associated with the browser and/or device, the browser engine 108 can provide information as to a user's interaction with a browser interface 111.

In one embodiment, CSS functionality can include a property value definitions:
  -ms-alt-url(FULLIMG, ALTIMG, RATIO)
  -ms-alt-url(fullimage.png, altimage.png, 0.50)
  -ms-alt-url(fullimage.png, placeholder, 0.50). As briefly described above, the "placeholder" key can be used to identify using a built-in image placeholder that the browser provides.

As one example for inline on an element:
  <div style="background: -ms-alt-url(fullimage.png, altimage.png, 0.50)"> This is some filler text</div>

As another example used within a style sheet file or style element:
  div{background: -ms-alt-url(fullimage.png, altimage.png, 0.50);}

Properties that accept the url( ) function should also support the -ms-alt-url( ) function.

A list of CSS properties that support url( ) include: Background; Background-image; Content; List-style; and, List-style-image. Accordingly, styles can be given information about element and where it is on a page and a determination can be made on how to handle the rendering of an associated image. Moreover, ASP/ASPX functionality can collect the necessary information and pass it to an associated/requested object and an ASP page can determine the appropriate information to send back to the user.

As described, below, and according to one embodiment, browser information can be used by the server 104 to generate one or more script parameters for use by the browser engine 108 when determining whether to request and/or load one of a primary or secondary advertisement image. For example, upon receiving resolution and positional information from the browser engine 108 as part of an image ASP request, server 104 ASP can operate to choose an appropriate image file to respond back to the browser engine 108. Additionally, the browser engine 108 can operate to substitute a locally stored image when a rendering size is below a predefined image size. For example, the browser engine 108 can operate to pull a recognizable logo, independent of visibility size, from memory 102 when an otherwise fetched image would be difficult to recognize by the user (e.g., ALT tags which can be used to transform the text web to small screen web).

The browser engine 108 can use a threshold or other parameter(s) to determine whether to fetch or request an image (or image portion) and/or other object from the server 104. For example, if the browser engine 108 determines that it would have to resize an image more than 50%, the browser engine 108 may not fetch or request the image. In such a case, the browser engine 108 can substitute a locally cached image or request a different image to take the place of the requested image. Accordingly, the browser engine 108 can operate to request and download images from the server 104 or some other server when a rendering size is at or greater than a percentage of a defined reduction size. As an example, the browser engine 108 may not request a 1920×1600 image from the server 104 that will be scaled down to 10% of the full size if the display size is 200×300 and the data miser feature has been selected.

As described briefly above, the browser engine 108 can, in addition to requesting and/or downloading viewable bits of a browser interface 111, provide feedback or other information as to positional and other configuration information associated with a user interaction (e.g., stylus, finger, vocalized, mouse, etc.) to scroll up or down, left or right, and/or to resize the browser window. For example, due in part to its size, a handheld communication device has a limited display area for displaying information, such as text, images, and video associated with a web page. Smaller fonts and display parameters may allow more textual and other information to be displayed in the browser interface 111. When a user uses a browser to download a web page, an image, such as an advertising logo, may not be initially viewable to the user. For example, handheld device user may have difficulty viewing an advertisement without using zoom controls, even though an advertisement image was rendered in the viewable space under these and other circumstances.

The browser engine 108 can use information associated with a user's interaction and/or the browser interface 111 to determine which bits to request for a viewable portion of a web page associated with a current viewable space of the browser interface 111. For example, a user may scroll down and over, or resize a browser window to view an image or read some text, and the browser engine 108, in conjunction with other component(s), can track the user interaction and limit its fetch or request to bits that are currently viewable (or newly viewable) to the browsing user. Devices with limited screen sizes and communication bandwidths can use the data miser functionality to reduce the download and rendering times by limiting the requesting and fetching of browser data to the browser data associated with a current viewable space of the browser interface 111. If the browser interface 111 is configured such that an image or portion thereof, text, and/or other object is not viewable to the current user, the browser engine 108, in the data miser mode, can operate to not fetch or request the associated unviewable bits from the server 104.

Accordingly, the browser engine 108 can also use configuration parameters of the browser interface 111 and/or display to further determine the viewable portion of a web page. For example, the browser engine 108 can determine a text size associated with a browser's configuration when determining whether an advertising charge should issue for an advertisement that was displayed in the current viewable space of the browser interface 111. The browser engine 108 can issue a toll event or some certificate associated with an advertisement charge depending upon the particular advertisement arrangement. For example, a particular advertising arrangement may charge advertisers for displayed advertisements that are displayed above a certain font or display size/resolution, displayed for a defined amount of time with an associated dimension/size/resolution parameter, etc. The browser engine 108 can operate to issue the toll event or some other identifying certificate under these and other circumstances when requesting and/or displaying data within the viewable space of the browser interface 111.

Correspondingly, the browser engine 108 can operate to provide information associated with the user experience when determining whether to charge an advertising provider or other entity for an advertisement associated with a particular web page or other browsing data. In one embodiment, a charge can be assessed if the browser engine 108 sends or issues a notification that an advertisement, or a defined portion of the advertisement, was located in a viewable space of a browser window. For example, the resource.asp can be used for ad tracking purposes to properly account for full or partial renderings of an advertisement. Charges can then be assessed using the associated data. For example, the browser engine 108 can operate to communicate a certificate of visibility if an advertisement image was requested, downloaded, and/or recognizably displayed in a current viewable space of a browser window.

As described briefly above, as part of an advertising or business model, the viewable data can be used to determine whether to charge an advertising entity for an advertising charge. In an embodiment, as part of an impression ad campaign, an advertiser is not charged for an advertisement if all or a designated portion of the advertisement is not within a current viewable space of a browser display. Stated differently, an advertiser is not charged for an advertisement as part of an impression ad campaign if all or a certain portion of the advertisement is not requested or downloaded by the browser engine 108 since the user would not have viewed the advertisement based in part on the current viewable space of a browser display.

As a result, and in accordance with such an embodiment, advertisers are not charged for advertisements that are unrecognizable to the user and/or not downloaded by the browser engine 108. Moreover, users do not have to be charged for browser data that is not downloaded and bandwidth may be more efficiently utilized since viewable browser data can be prioritized as part of downloading operations. For example, if the browser engine 108 determines that bits associated with an advertisement are not to be downloaded since they are not in the user's viewable window, the advertiser or other entity is not charged.

In one embodiment, an advertiser or other entity is only charged for the advertisement when the browser engine 108 issues a toll event, certificate, and/or other acknowledging signal to alert the server 104 or other device/system that an advertisement is in the viewable space of a device display. In another embodiment, information can be embedded in an image or other object (e.g., using steganography to embed advertising code, messages, etc.) which can be read and used to determine whether to charge an advertising or other entity. For example, a flash, applet, or other application can be used to fire off an acknowledging signal when an image, or portion thereof, becomes visible within the display. The layout engine 109 can also operate to send an event signal or other signal associated with the display of an image or object.

In addition to the functionality described above, the browser engine 108 can operate to provide information based in part on dimensions of an ad (or portion of the ad) included in the visible or viewable space of the browser interface 111. The information can be communicated to the server and used by business and other systems to use the information for various business requirements. In one embodiment, as part of an advertisement monetization model, the browser engine 108 can operate to communicate visible dimensions of an advertisement image to the server 104 or dedicated billing system since the browser engine 108 is requesting browser data associated with a current viewable space of the browser interface 111 (e.g., browser window).

For example, the browser engine 108, as part of a deterministic operation, can inform the server 104 or other system that 120×300 pixels out of 400×600 pixels of an advertisement image were visible in a current viewable space of a browser window. Depending on the implemented model, an associated advertising entity may or may not be charged for the particular advertisement impression. The browser engine 108 can also operate to provide additional visibility or placement information to the server 104, such as top left corner visible, lower left corner visible, etc.

As described above, a billing or other system can use the information provided by the browser engine 108 to generate an advertisement charge based in part on terms of a given contract or other negotiation with an advertiser. Alternatively, a billing or other system can use information provided by the server 104 to generate an advertisement charge based in part on terms of a given contract or other negotiation with an advertiser since the server 104 has knowledge of browser data that was requested and downloaded by the browser engine 108.

As an example, according to one advertising model, an advertising charge can issue under the following circumstances: 1) if the area in the current viewable space of the browser window is greater than or equal to X % then consider it visible (e.g., X % could be 50% or some other quantification); 2) charge based in part on the percentage of an advertisement that was visible in the current viewable space of the browser window (e.g., if 40% of an ad is visible, then issue a charge of 40% of the contracted rate; 3) if multiple partial dimensions were sent by the browser engine 108 (e.g., the user scrolled a little bit which may have required additional download requests for the additional data, but not enough to expose the rest of an ad) then use the largest set of dimensions for billing purposes; 4) charge based in part on preference of certain viewable locations (e.g., top left must be visible to be billable since that is where my logo is, regardless of % visible, etc.); 5) only charge for advertisements that were 100% visible in the viewable space of the browser window; 6) no charge for advertisements that were not included in the viewable space of the browser window; 7) provide discounts based on ad visibility (e.g., no charge for the first N impressions that are not visible or based on some % of a visible ad); etc.

As described briefly above, the server 104, in addition to other functionality, can operate to dynamically provide web pages for consumption by the browser engine 108 through the network 106, but is not so limited. The server 104 can also operate to generate fixed content web pages for consumption by the browser engine 108. Dynamically generated, fixed, and other web page types can include content and other data, such as video, audio, images, advertising data, and other information. In one embodiment, an advertisement server or ad server (e.g., local and/or remote server(s)) can be used to communicate advertisement images and other advertisement content that the server 104 can use to dynamically generate web page data for a targeted user.

The ad server can be used to provide advertisement data which is to be located on specific portions or pixel locations of a fixed web page (e.g., upper left, upper center, pixels xx-xx, x-xx, etc.) The server 104 can use script generator component 116 which includes scripting features to dynamically provide web page data, including advertisement images, or portions thereof, to the browser engine 108. As described above, a request for web page data can include additional information, including information associated with a current viewable space of the browser display or interface, that can be used to quantify web page data to be included as part of a download package. Moreover, the browser engine 108 can communicate quantification data to the server or other component(s), wherein the quantification data can be used to monetize advertising and other business entities associated with the browser data downloaded and/or displayed in the browser interface 111. For example, the browser engine 108 can issue quantification data (e.g., a toll event, etc.) that can be used to identify that designated data (e.g., advertising data or portions thereof, etc.) was requested, downloaded, and/or displayed in the current viewable space of the browser interface 111.

In another embodiment, upon receiving a download request for web page data from the browser engine 108, the server 104 can operate to examine image sizes associated with a requested web page using server-side scripting features of the script generator component 116. The server 104 can use features of the script generator component 116 to provide an entire image or a portion of an image based in part on the configuration of the browser engine and/or display. For example, the server 104 can operate to examine an image size of an image associated with a requested web page using one or more active server page (ASP) server side scripts for a dynamically generated web page.

Moreover, the browser engine 108 and the server 104 can negotiate an efficient partial image download optimizing the communication bandwidth. For example, assume an image is 1000×1000 pixels. The browser engine 108 informs the server 104 that is can only display 100×100 pixels, and the user has scrolled to the middle of a web page image. The browser engine 108 can issue a fetch request to the server 104 for the (x, y) coordinates of the image at (400,400 to 500, 400)×(400,500 to 500,500). The server 104 can then perform a scatter read or other read operation on the image to provide the requested bits or pixel data. As described above, the browser engine 108 can operate to cache and append image portions from the local cache 114 to generate a total image. In one embodiment, the browser engine 108 can operate to request an image, and then issue a TCP reset to the connection when enough of the image bytes have been downloaded to fill a current viewable space.

Components of system 100 described above can be implemented as part of networked, distributed, and/or other computer-implemented and communication environments. Moreover, the browsing functionality can be used in conjunction with a desktop computer, laptop, smart phone, personal data assistant (PDA), ultra-mobile personal computer, and/or other computing or communication devices to provide browsing and other data. The system 100 can be employed in a variety of computing/communication environments. For example, the system 100 can used with devices/systems having networking, security, and other communication components configured to provide communication functionality with other computing and/or communication devices.

While a communication architecture is shown in FIG. 1, functionality of various components can be also combined or further divided. For example, while one server 104 is shown, the system 100 can include a plurality of servers. Moreover, the server 104 can communicate with other servers, such as ad servers, content servers, search engine servers, and other serving devices to generate dynamic and static web page data. Additionally, the various embodiments described herein can be used with a number of applications, systems, and other devices and are not limited to any particular implementation or architecture. Moreover, certain components and functionalities can be implemented in hardware and/or software. While certain embodiments include software implementations, they are not so limited and also encompass hardware, or mixed hardware/software solutions. Also, while certain functionality has been described herein, the embodiments are not so limited and can include more or different features and/or other functionality. Accordingly, the embodiments and examples described herein are not intended to be limiting and other embodiments are available.

Figure 2:
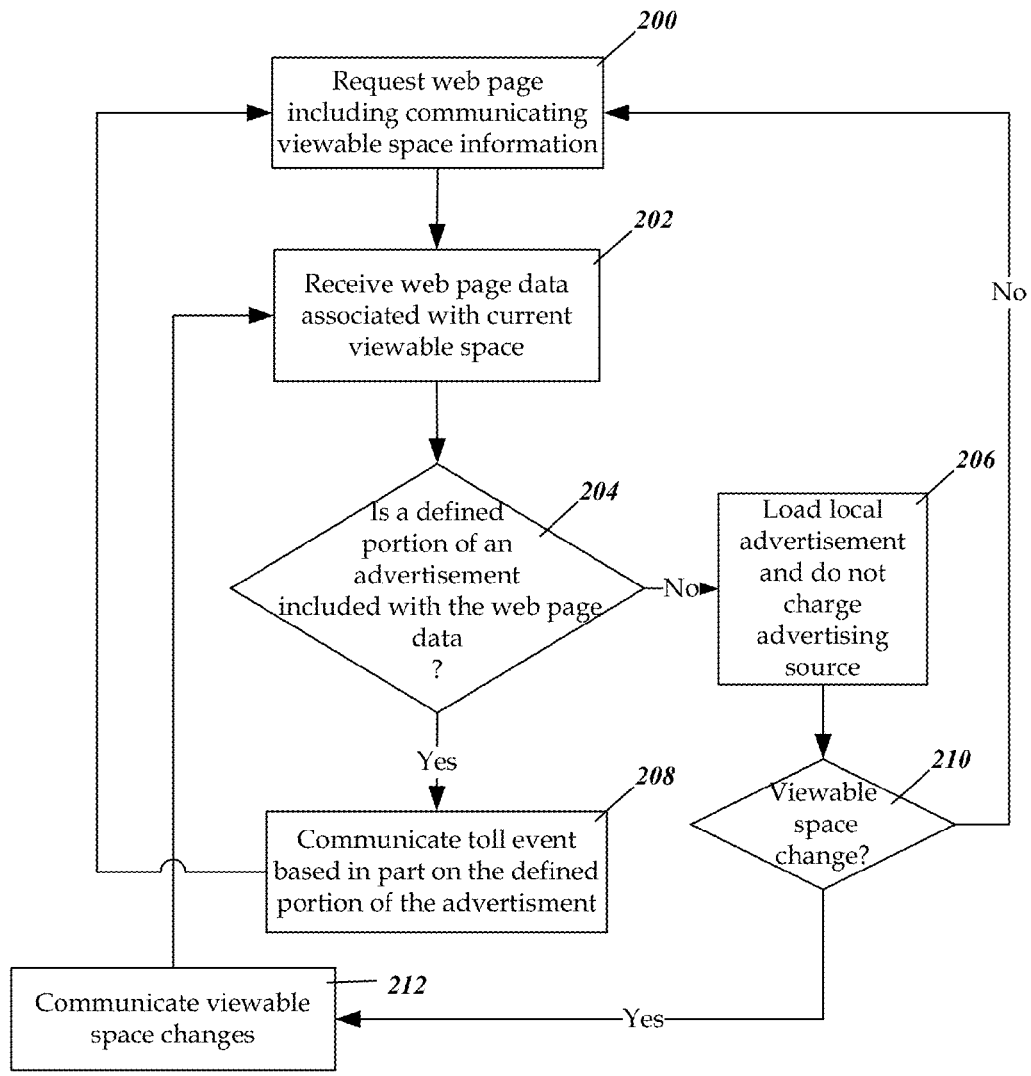
FIG. 2 is a flow diagram illustrating an exemplary process of using browsing data.

FIG. 2 is a flow diagram illustrating an exemplary process of browsing operations using a communication network. For example, the browsing operations can be used to request web pages and web data based in part on a current viewable space of a browser interface. Components of FIG. 1 are used in describing the flow diagram, but the described embodiments are not so limited. At 200, a user uses a browser to request a web page from server 104 or some other server. For example, the user can enter a URL or select a link from some other web page or location. Assume for this example, that the user has configured the browser engine 108 to employ the data miser feature to limit requests for browser data to a current viewable space of a browser interface 111 (e.g., see FIGS. 4A-4C).

As part of the request, the browser engine 108 can also communicate information associated with the current viewable space of the browser interface 111 to the server 104, but is not so limited. For example, the request can include one or more of a browser configuration, display resolution, pixel count, pixel configuration, and/or a physical size of the display. In an alternative embodiment, based in part on the request and viewable space information, the server 104 can operate to provide image size and other information that the browser engine 108 can use in determining which image data to request and/or substitute for a web page image to be displayed in the device display 110.

In another embodiment the browser engine 108, in conjunction with the layout engine 109, can operate to determine the visible space available to display the image and only makes the <IMG> tag request if it meets the quality of service (QOS) attributes (if provided). At 202, the browser engine 108 receives the viewable web page data from the server 104 based in part on the current viewable space of the browser interface 111. For example, device requests can include: 1) providing screen resolution and/or other information to the server 104 or other component(s) when requesting a page or portions thereof; 2) all display data; 3) data that fits on a requested page; and/or 4) image(s) from server 104 or other component(s) with attributes which information provided in conjunction with the attributes.

At 204, the browser engine 108 determines whether a defined portion of an advertisement is included with the received web page data. For example, the defined portion of an advertisement can be an entire image file or a defined percentage of an image file. In an alternative embodiment, the browser engine 108 can also determine if advertisement data will be displayed sufficiently to be recognized by the user. The browser engine 108 can also use scrolling, resizing, and other interactive information to determine if an advertisement is recognizable and/or request remaining data associated with a partial advertisement download. If a defined portion of the advertisement is not included with the received web page data, at 206, the browser engine 108 can operate to load locally stored advertisement or other display data (including leaving blank) in the designated location of the web page and not communicate quantification data, such as a toll event for example, that can be used to charge an associated advertising source. For example, the browser engine 108 can issue a toll event when a defined amount of an advertisement is requested and/or displayed in the current viewable space of the browser interface 111, wherein the toll event informs the server 104 of the display for assessing an associated charge.

However, if a defined portion of the advertisement is included with the received web page data and/or displayed in the browser interface 111, at 208, the browser engine 108 can operate to communicate the quantification data for charging an associated advertising source for an ad impression based in part on the defined portion of the advertisement received and/or displayed. For example, the browser engine 108 can operate to issue a toll event if an entire or defined portion of an advertisement image was requested from the server 104 and/or displayed above a certain display size that would be recognizable to a user based in part on the associated device and/or browser configurations and characteristics. At 210, the browser engine 108 determines if the viewable space has changed.

For example, a user may have scrolled to another location or resized the browser interface 111 or used a zoom feature to change the rendered content size for the entire page. An embodiment can include a zoom in feature with settings 125%, 150%, 200%, etc. which show less content overall however rendering with larger attributes filling the same display region. Additionally the zoom out feature with settings like 75%, 65%, 50%, etc. showing more content overall in the display region of the browser interface 111 (e.g., rendering with smaller attributes (fonts and images)). At 212, the browser engine 108 communicates parameters associated with the viewable space change to the server 104 if the viewable space has changed. Otherwise, the flow returns to 200.

Figure 3:
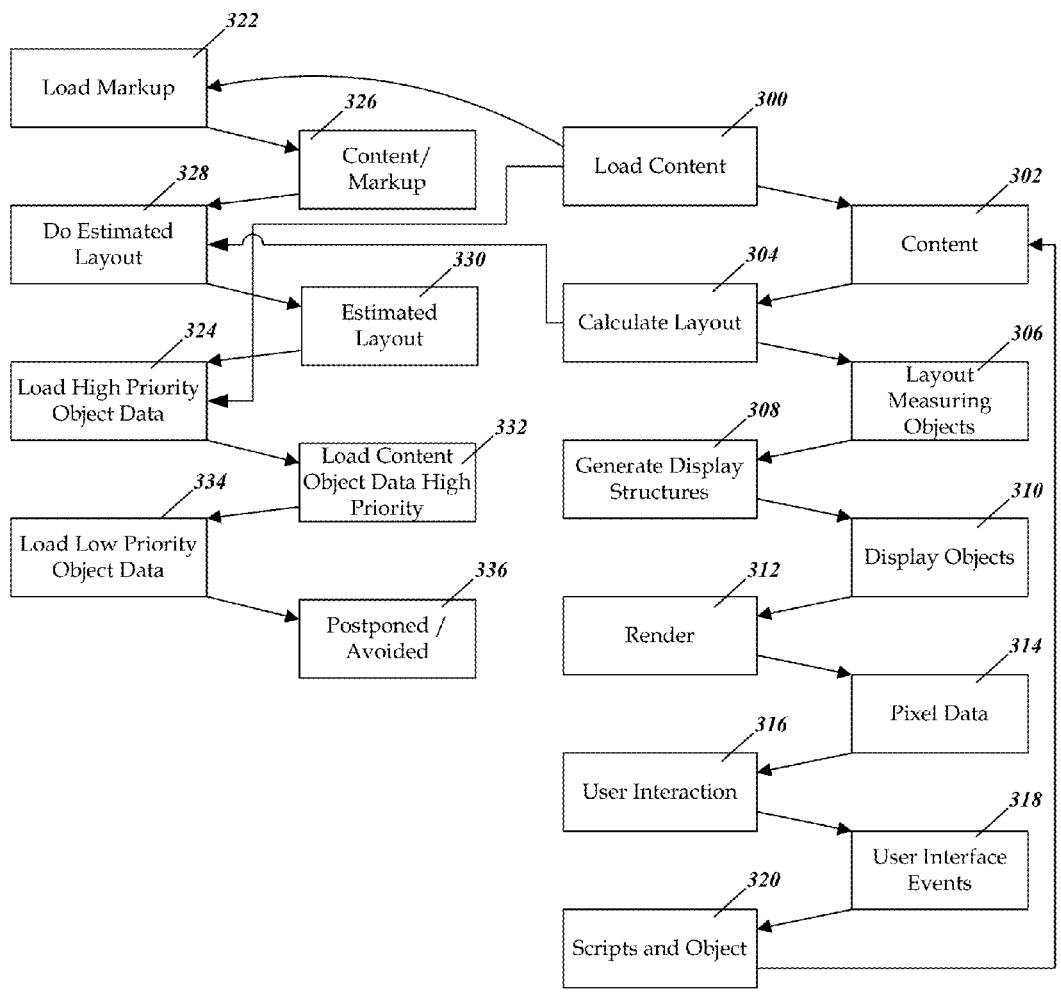
FIG. 3 is a flow diagram illustrating an exemplary process of using browser data.

FIG. 3 is a flow diagram illustrating an exemplary process of using a dynamic layout engine and rendering by the browser application based in part on data requests limited to visible object and other data. As described below, a user computing device includes a browser that can perform browsing and other operations as part of a networked, distributed, and/or other computing environment. In an embodiment, the browser can operate to request web page data based in part on a web page request and/or a current viewable space of a browser interface. For example, the browser can operate to request web page data based in part on a current viewable space of a browser interface, wherein the current viewable space of the browser interface can be based on one of a pixel resolution, browser configuration, interaction information, pixel count, a display size, and/or position of the browser application on the virtual desktop or user interface shell, including the application status running full screen or only a portion of the visible screen.

At 300, the browser operates to request and/or load content 302 associated with the current viewable space of the browser interface, wherein the content can include viewable bits of web page and other data, such as advertisement data for example. For example, a handheld device user may only be able to view a limited portion of a web page due in part to the size of the device and the display architecture. At 304, the browser, in conjunction with a layout engine or other component, operates to calculate the layout of the current viewable space associated with the viewable bits, wherein the layout can include a number of layout measuring objects 306 that are measured against the visible portion of the display. At 308, the browser operates to generate a number of display structures 310 associated with the current viewable space, wherein a number of display objects can be associated therewith.

At 312, the browser can operate, in conjunction with a display driver or other display device, to render the viewable bits (e.g., the display objects 310) as pixel data 314 in the current viewable space of the browser interface including the number of display objects. At 316, the browser can detect whether a user has interacted with the browser interface and/or requested additional web page data according to a number of user events 318. For example, a user may have scrolled to a previously unviewable part of a web page, resized the browser interface, or typed in a different URL. These and other actions can drive another evaluation of the visible region and download from the remote site content to provide additional display objects 310.

At 320, the browser can use scripts and other objects to further browser operations and/or provide feedback and other information to other components of the computing environment. For example, the browser can use script information generated by a web server to determine if an advertisement image should be downloaded or whether a readily identifiable logo, symbol, or other source identifier should be pulled from a local cache or other storage (local or remote) for display in an image placeholder.

Returning to 300, and as part of the operation(s) at 300, the browser can also operate to load markup information at 322 and/or load high priority object data at 324, such as visible images as well as optionally those which reside just outside the visible or current viewable space for example. As part of the operation at 322, the browser can also operate to load content and/or markup 326. At 328, the browser operates to determine an estimated layout 330 associated with the viewable space of the browser interface without having to download all the image payloads, only the size (e.g., width, height, etc.) of the images is necessary as well as information where the images should be placed as provided by the web page designer for example. As shown in FIG. 3, operation 328 also follows the calculate layout operation at 304.

At 324, the browser operates to load high priority object data, which can include content 332 associated with the high priority object data. At 334, the browser operates to load low priority object data, such as off screen non-advertisement based images (e.g., those without a visible quality of service (QOS) quotient in the associated markup) and at 336 determines if further operations associated with the low priority object data should be avoided and/or postponed until some subsequent time. While a certain order and number of operations are described with respect to FIGS. 2 and 3, the order and/or number of operations and/or components can be modified and/or reconfigured according to a desired implementation. For example, operations can be selectively added, removed, rearranged, etc. according to a desired implementation. Accordingly, other embodiments are available.

Figure 4A:
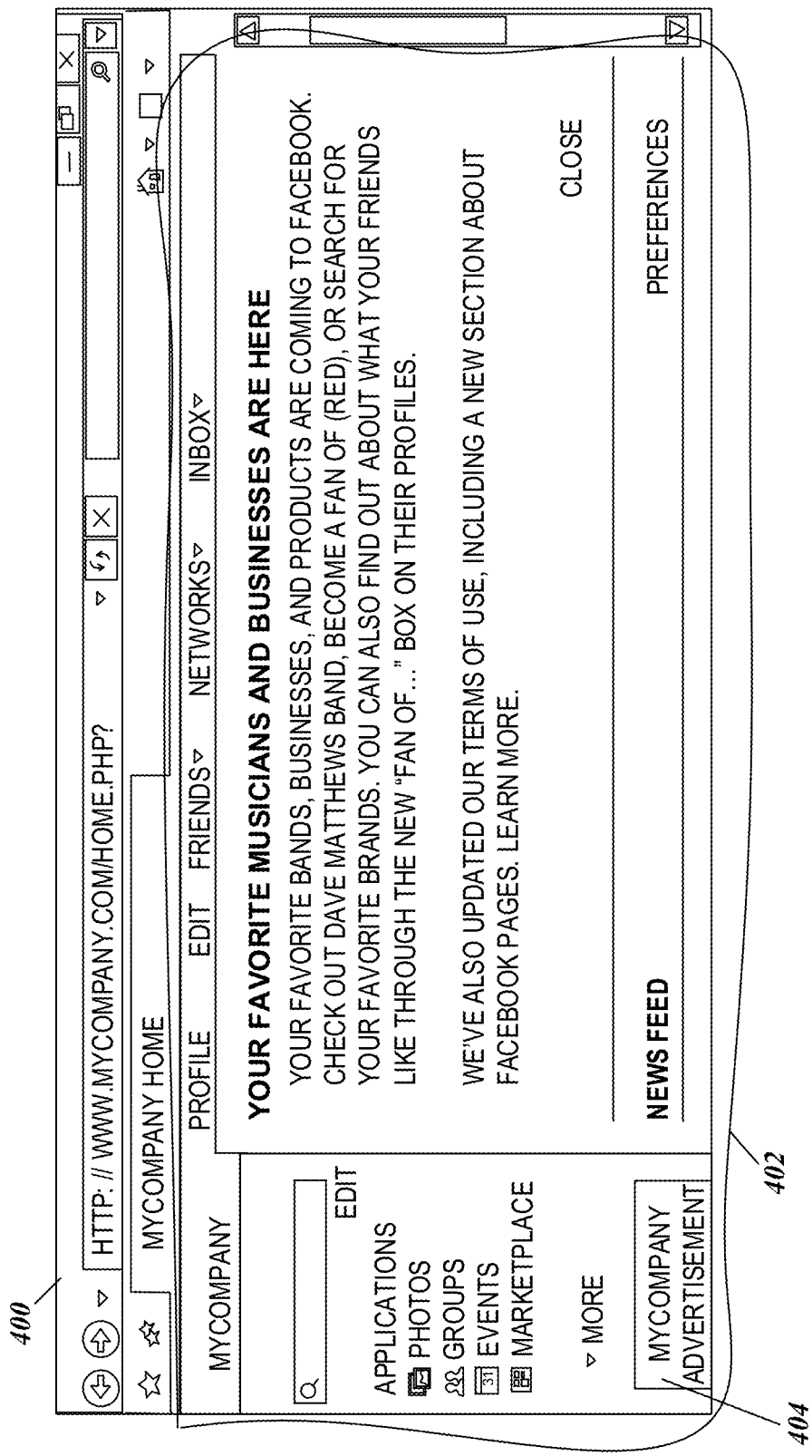
FIGS. 4A-4C illustrate an example of providing browsing data associated with a viewable space.
Figure 4B:
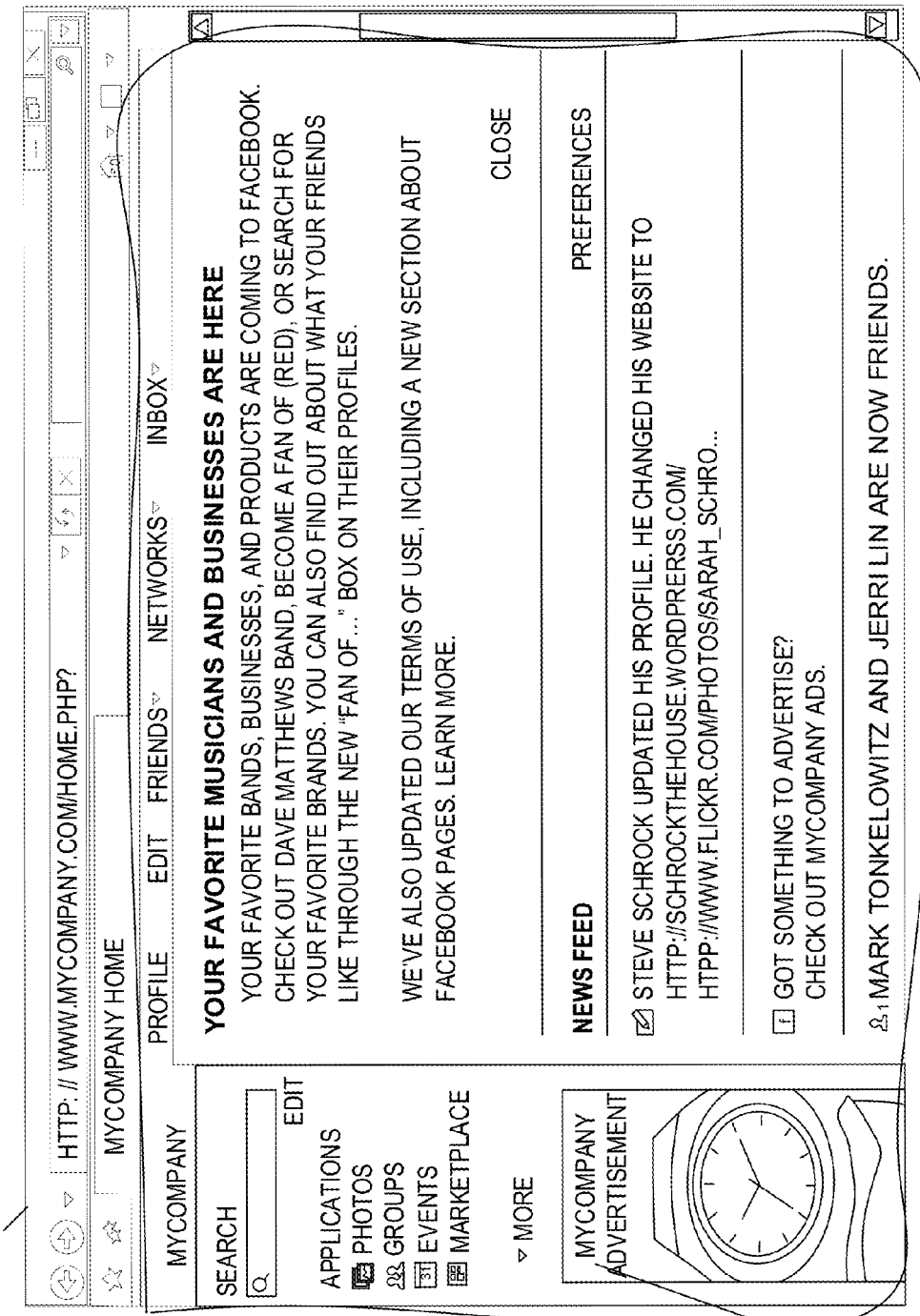
Figure 4C:
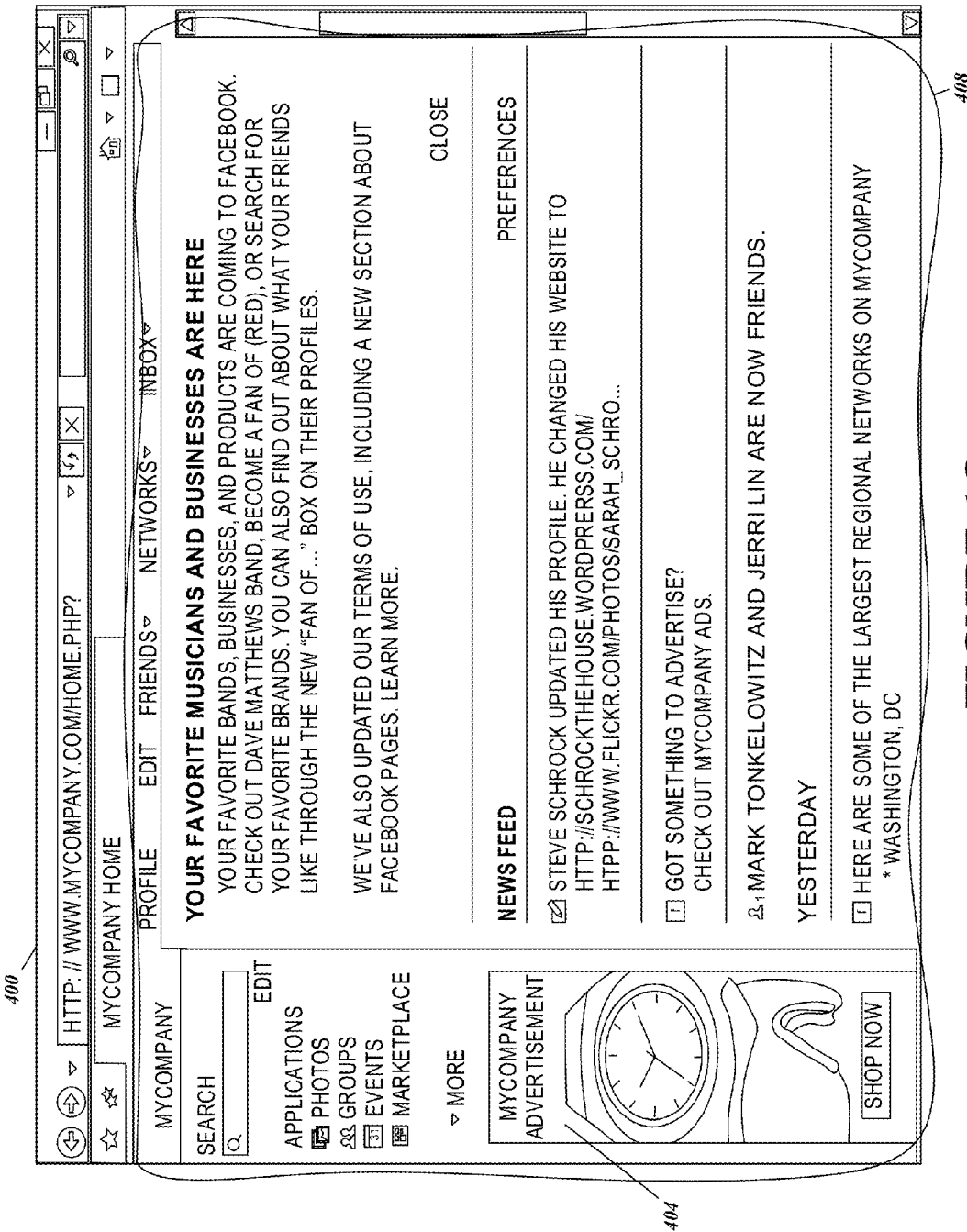

FIGS. 4A-4C depict an exemplary browser interface 400 associated with a browser which can be displayed on the display of a computing device. For example, a user can use a smart phone browser to browse the Internet by typing in URLs or selecting web page links to access web page data. As shown in FIG. 4A, the browser interface 400 includes a current viewable space, shown generally by lasso 402, which includes viewable bits of a requested web page. As described above, the browser can operate to limit its data request to viewable bits associated with the current viewable space of the browser interface 400 absent requesting unviewable bits or data.

As part of its downloading operation associated with the request, the browser has received viewable bits of an advertisement 404 that are not currently recognizable to determine an advertising source by the user. As described above, in an alternative embodiment, the browser can operate to substitute a recognizable advertisement or other image in such a situation when requested bits of an image are unrecognizable or require further user interaction. Bandwidth may be allocated inefficiently and download times may increase when an image is designated to be located in an off-screen or unviewable region of a display based in part on a web page layout design. In such a situation, a server-side script can be used to assist in request and download operations. For example, a server-side script using ASP can include:

```
<img
  src="./ds/U0UARUA01UAU/
  Black_Friday_Promo_Flash_120x600.jpg?ver=1 " width =
  "%img.width%"; height = "%img.height%"; alt_ratio=".50"
  alt_img="temp.img" />
```

The example script can execute on a server to dynamically populate the height/width layout attributes to assist the browser with layout using null or secondary images until the designated location becomes visible and/or recognizable. The <img> tag can also support "alt" attributes such as alt_ratio="0.50"; alt_img="temp.img" for example, which informs the browser to substitute a locally stored image until the image is viewed at 50% of the original size. The alt_ratio is an example of a quality of service (QOS) attribute; amount of image visible on the display as computed by the ratio of visible pixels vs. total image pixels. Other QOS attributes can include: distance from edge, proximity to center of the page as well as define the number of pixel rows and/or columns (or combination thereof) which should be visible to create the billable image fetch or toll event.

The ratio can be greater than or equal to the ratio; greater than, or conversely do not download if less than a certain %, or less than or equal to the QOS attribute etc. The browser can generate a billable event when the user views the image at 50% or larger ratio and the browser can then fetch the advertisement image or a portion thereof. The server can then issue a billable charge for the billable event to an advertising or other entity. In many current implementations, advertisers do not know that their image was actually rendered on the visible portion of the display within the quality of service attributes desired. If the data miser feature is enabled and the QOS attributes configured on the web page, the image shown by 404 would not have been downloaded because it did not fit 50% or greater on the screen.

FIG. 4B illustrates the browser interface 400, wherein the user has interacted therewith to resize the browser interface 400 to obtain a new viewable space shown generally by lasso 406. The advertisement 404 is now recognizable to the user and the browser can generate quantification data associated with a billable event for the advertisement impression. Moreover, the browser submitted an additional download request to request the additional viewable bits shown in FIG. 4B as compared to FIG. 4A. Accordingly, the browser only needs to request the bits associated with the new content after the resizing since the browser has operated to store the previously requested viewable bits of FIG. 4A in memory. It should be appreciated that the web page contains additional HTML markup content below what is shown in the FIG. 4B, however images associated with those sections of the page that are not visible will not be downloaded because their QOS attributes will not be satisfied due in part to the data miser features.

FIG. 4C illustrates the browser interface 400, wherein the user has interacted therewith to resize the browser interface 400 to obtain a new viewable space shown generally by lasso 408. The display of advertisement 404 is now complete. As described above, the browser submitted an additional download request to request the additional viewable bits shown in FIG. 4C as compared to FIGS. 4A and 4B. For example, this could be the first time the entire image was downloaded from the server based in part on QOS attributes whereby the advertiser can choose all or nothing, or portions of the images to download based upon the visible portion in the visible display region. Accordingly, the browser has limited its download request to the bits associated with the new content after the resizing since the browser has operated to store the previously requested viewable bits of FIGS. 4A and 4B.

Figure 5:
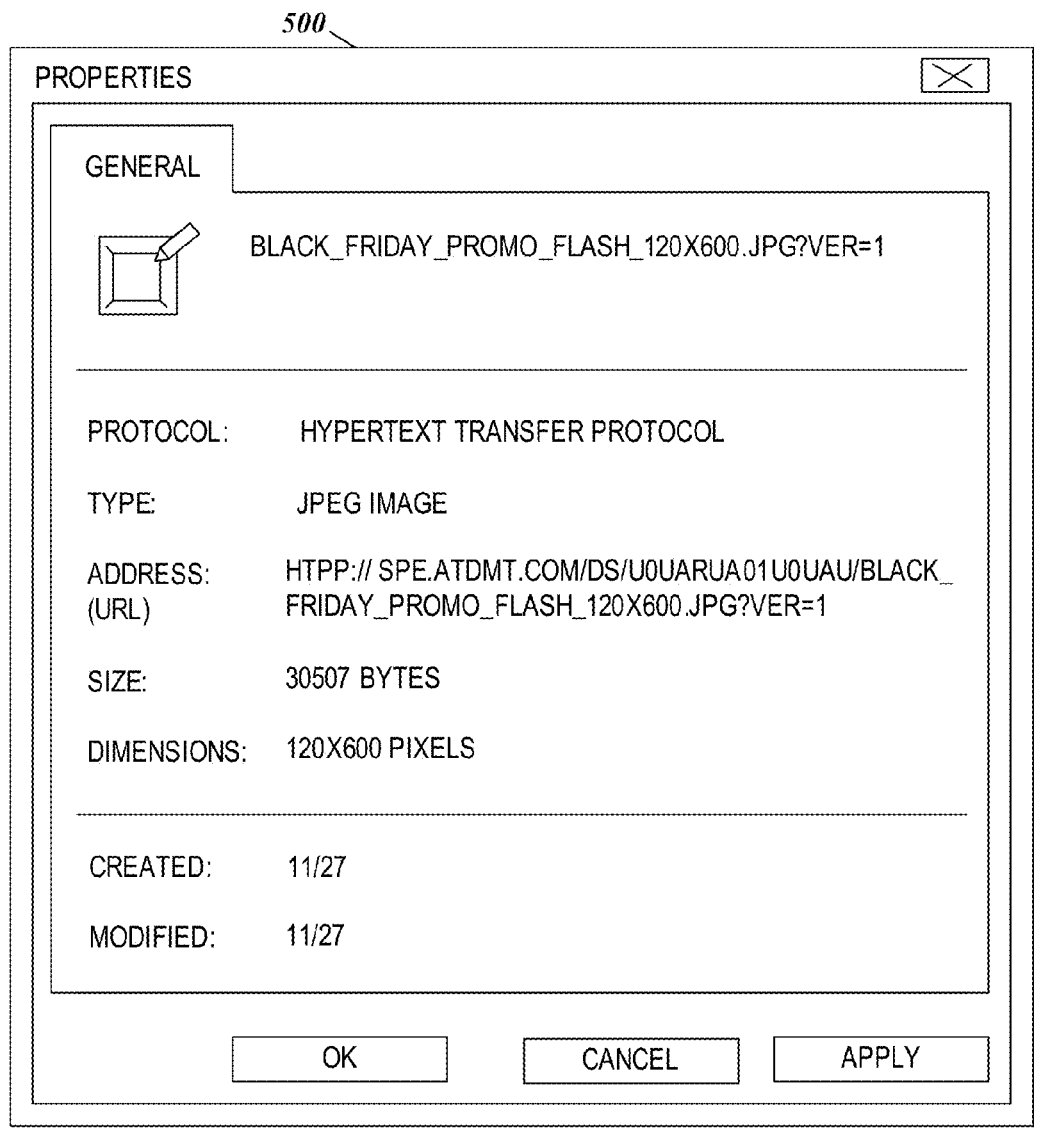
FIG. 5 illustrates properties of an advertisement of FIG. 4C.

FIG. 5 illustrates properties of the advertisement shown in of FIG. 4C. The properties of FIG. 5 include pixel information which can be detected by the user device and/or server software. As shown, the size of the advertisement 404 is nearly 30 Kbytes. However, about 5% of the advertisement 404 is viewable in FIG. 4A. The entire web page download is about 64

Kbytes. Accordingly, the advertisement 404 would constitute the majority of content downloaded if the browser were to request more than the viewable bits of the viewable space. In FIG. 4A the majority of bits downloaded from the remote servers would not have even been visible on the screen unless the user had resized or scrolled the page as was described in FIGS. 4B and 4C.

Figure 6:
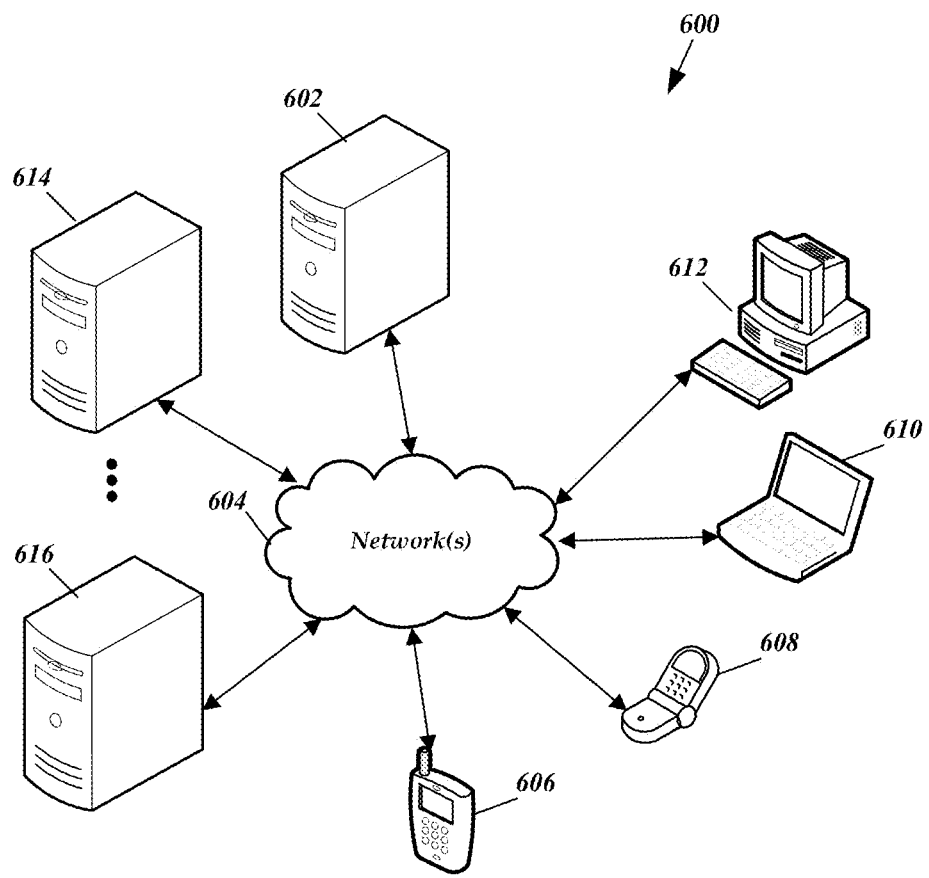
FIG. 6 illustrates an exemplary networked environment for implementation of various embodiments described herein.

FIG. 6 is an example networked environment 600, where various embodiments may be implemented. Browsing operations can be implemented in such a networked environment 600. As shown in FIG. 6, the networked environment includes a web server 602 which can operate to efficiently provide browser and other data using the network(s) 604, but is not so limited. In various embodiments, the networked environment 600 can include a topology of servers, clients, devices, Internet service providers, communication media, and other network functionality. The networked environment 600 can also include a static or dynamic topology. The term "client" can refer to a client application, device, and/or system. Each client device/system (e.g., smart phone 606, mobile phone 608, laptop 610, desktop 612, etc.) can be configured with a browser which can interact with the web server 602, ad server 614, collaboration server 616, and/or other devices and systems to browse the networked environment 600. For example, a user can use a browser to request web page data across the network(s) 604, wherein the web page data request can be limited to a current viewable space of a browser interface.

The networked environment 600 can include a secure network such as an enterprise network, an unsecure network such as a wireless open network, the Internet, or some other network or combination of networks. By way of example, and not limitation, the networked environment 600 can include wired media such as a wired network or direct-wired connection, and/or wireless media such as acoustic, radio frequency (RF), infrared, and/or other wireless media. Many other configurations of computing devices, applications, data sources, data distribution systems, etc. can be employed to implement browsing and other functionality. Moreover, the networked environment 600 of FIG. 6 is included for illustrative purposes. Embodiments are not limited to the example applications, modules, devices/systems, or processes described herein.

Exemplary Operating Environment

Figure 7:
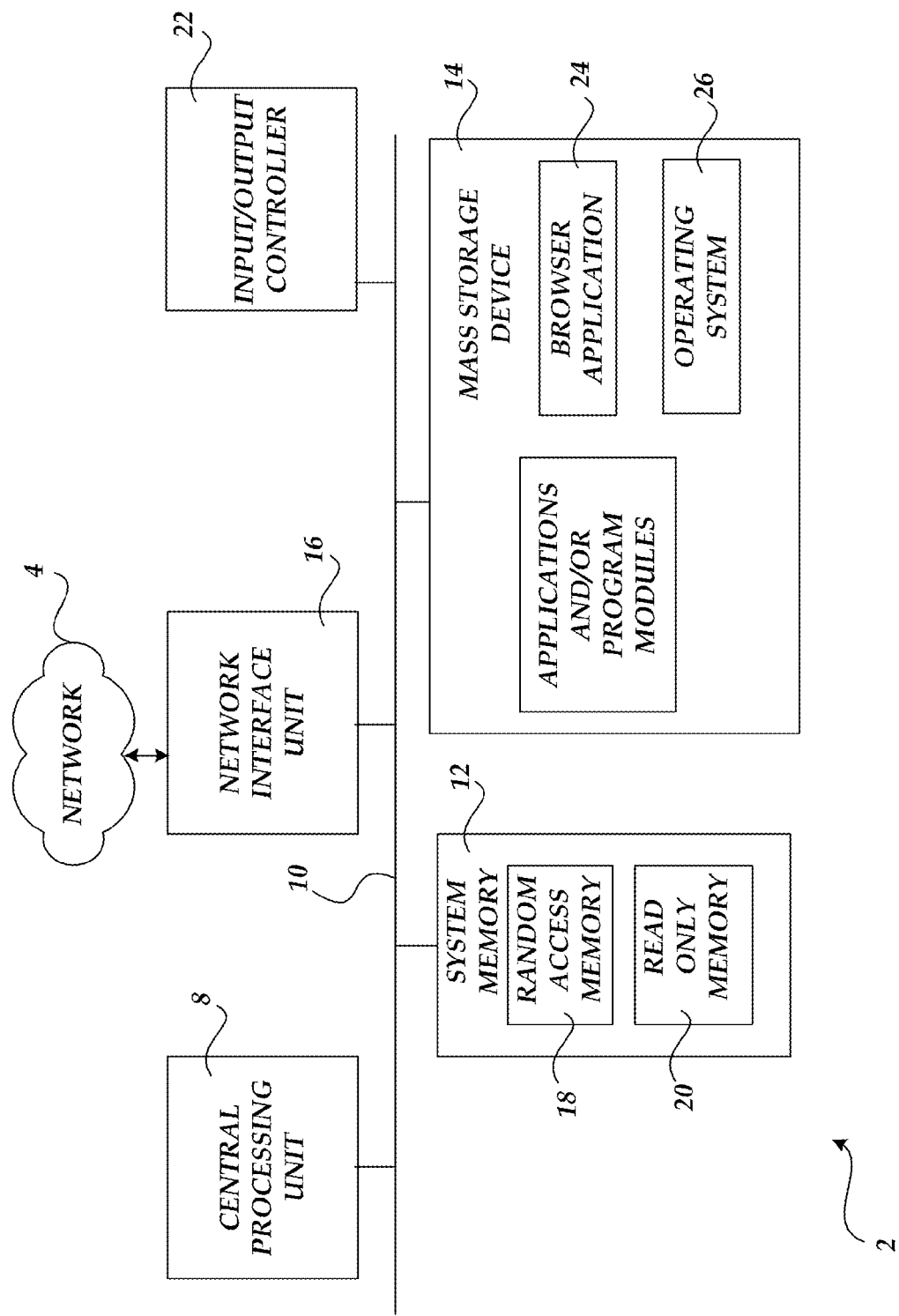
FIG. 7 is a block diagram illustrating an exemplary computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computing device 2 comprises a general purpose desktop, laptop, handheld, tablet, or other type of computer capable of executing one or more application programs. The computing device 2 includes at least one central processing unit 8 ("CPU"), a system memory 12, including random access memory 18 ("RAM"), read-only memory ("ROM") 20, and a system bus 10 that couples the memory to the CPU 8. A basic input/output system containing the basic routines that help to transfer information between elements within the computer, such as during startup, is stored in the ROM 20.

The computing device 2 further includes a mass storage device 14 for storing an operating system 26, application programs, and/or other program modules. The mass storage device 14 is connected to the CPU 8 through a mass storage controller (not shown) connected to the bus 10. The mass storage device 14 and its associated computer-readable media provide non-volatile storage for the computing device 2. Although the description of computer-readable media contained herein refers to a mass storage device, such as a hard disk or CD-ROM drive, it should be appreciated by those skilled in the art that computer-readable media can be any available media that can be accessed or utilized by the computing device 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 2.

According to various embodiments, the computing device 2 may operate in a networked environment using logical connections to remote computers through a network 4, such as a local network, the Internet, etc. for example. The computing device 2 may connect to the network 4 through a network interface unit 16 connected to the bus 10. It should be appreciated that the network interface unit 16 may also be utilized to connect to other types of networks and remote computing systems. The computing device 2 may also include an input/output controller 22 for receiving and processing input from a number of input types, including a keyboard, mouse, keypad, pen, stylus, finger, speech-based, and/or other means. Other input means are available including combinations of various input means. Similarly, an input/output controller 22 may provide output to a display, a printer, or other type of output device. Additionally, a touch screen or other digitized device can serve as an input and an output mechanism.

As mentioned briefly above, a number of program modules and data files may be stored in the mass storage device 14 and RAM 18 of the computing device 2, including an operating system 26 suitable for controlling the operation of a networked personal computing device, such as the WINDOWS operating systems from MICROSOFT CORPORATION of Redmond, Wash. for example. The mass storage device 14 and RAM 18 may also store one or more program modules.

The mass storage device 14, or other storage, and the RAM 18 may store other application programs or modules, including browser application 24.

The browser application 24 may be a separate application or an integral module of a hosted service application that provides browsing services using computing device 2. As discussed above, browser application 24 can operate to request and/or download browser data associated with a current viewable space of a browser interface, but is not so limited. The browser application 24 can employ different methods to request and/or download browser data associated with a current viewable space. The browser application 24 can also provide tolling data that can be used to monetize advertising and other business activities.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of a computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A server computer comprising:
    a processor; and
    a memory communicatively coupled to the processor, the memory storing computer-readable instructions that when executed by the processor cause the server computer to:
        receive a prioritized request for a web page from a mobile device, wherein the prioritized request for the web page is limited to a current viewable space of a browser interface of the mobile device and the prioritized request includes one or more of a group comprising: feedback that corresponds to a user's interaction with the viewable space of the browser interface, a configuration of the browser interface, a resolution of a display of the mobile device, a pixel count of the display of the mobile device, a pixel configuration of the display of the mobile device, and a physical size of the display of the mobile device;
        determine viewable data based on the prioritized request;
        communicate the viewable data to the mobile device;
        receive quantification data for a designated portion of the web page from the mobile device, wherein the quantification data identifies an amount of the designated portion of the web page that is viewable in the current viewable space of the browser interface of the mobile device;
        dynamically populate layout attributes using a server script to assist the browser interface with layout operations for the web page when the quantification data indicates that the designated portion of the website is unviewable.

2. The server computer of claim 1, the computer-readable instructions further causing the server computer to inform the browser interface to substitute one or more secondary images until a designated image location becomes visible.

3. The server computer of claim 1, wherein the prioritized request includes feedback that corresponds to a user's interaction with the viewable space of the browser interface and the feedback comprises a scroll location.

4. The server computer of claim 3, the computer-readable instructions further causing the server computer to communicate zones of a web page based in part on the scroll location.

5. The server computer of claim 4, the computer-readable instructions further causing the server computer to communicate the zones of the web page that are adjacent to the scroll location.

6. The server computer of claim 4, the computer-readable instructions further causing the server computer to communicate the zones of the web page that are contiguous to the scroll location.

7. The server computer of claim 1, the computer-readable instructions further causing the server computer to receive load receipt events associated with the viewable data.

8. The server computer of claim 1, the computer-readable instructions further causing the server computer to receive a tolling event associated with a rendering of a defined portion of an image with the viewable data.

9. The server computer of claim 1, the computer-readable instructions further causing the server computer to receive height and width attributes associated with a quality of service preference.

10. The server computer of claim 1, the computer-readable instructions further causing the server computer to generate one or more script parameters for determining whether to communicate a secondary image.

11. The server computer of claim 1, the computer-readable instructions further causing the server computer to:
    receive resolution information from the browser interface;
    select an image file based at least in part on the resolution information and the prioritized request; and
    communicate the image file to the browser interface.

12. The server computer of claim 1, the computer-readable instructions further causing the server computer to receive quantification data if the viewable data does not include the defined amount of the designated data.

13. The server computer of claim 1, wherein the feedback that corresponds to a user's interaction with the viewable space of the browser interface comprises resizing information.

14. The server computer of claim 1, wherein the designated portion of the web page is an image.

15. The server computer of claim 14, wherein the quantification data comprises an amount of the image visible on the display of the mobile device.

16. The server computer of claim 15, wherein the amount of the image visible on the display of the mobile device comprises a ratio of one or more visible pixels of the image compared to a total number of pixels of the image.

17. The server computer of claim 16, wherein the image is unviewable if the ratio is less than 0.5.

* * * * *